United States Patent [19]

Clavier

[11] 4,292,136
[45] Sep. 29, 1981

[54] DEVICE FOR DESALTING SEA OR BRACKISH WATER BY USING SOLAR ENERGY

[75] Inventor: Philippe Clavier, Marly-le-Roi, France

[73] Assignee: Spie-Batignolles, Puteaux, France

[21] Appl. No.: 70,498

[22] Filed: Aug. 28, 1979

[51] Int. Cl.³ .............................................. B01D 1/00
[52] U.S. Cl. .................................. 202/234; 159/1 S; 203/10; 203/DIG. 1
[58] Field of Search ............... 202/234, 176, 177, 100, 202/185 R, 187; 203/10, DIG. 1; 159/1 S, 1 SF

[56] References Cited

U.S. PATENT DOCUMENTS

| | | | |
|---|---|---|---|
| 2,803,591 | 8/1957 | Coanda et al. | 202/234 |
| 2,820,744 | 1/1958 | Lighter | 202/234 |
| 3,248,307 | 4/1966 | Walford | 203/11 |
| 3,314,862 | 4/1967 | Hay | 203/10 |
| 3,351,536 | 11/1967 | Fox | 207/83 |
| 3,407,122 | 10/1968 | Dickinson | 202/234 |
| 3,501,381 | 3/1970 | Delano | 202/83 |
| 3,653,150 | 4/1972 | Howard | 202/234 |
| 3,960,668 | 5/1977 | Rush | 202/185 R |
| 4,135,985 | 1/1979 | La Rocca | 202/234 |
| 4,151,046 | 6/1979 | Eidelberg | 202/180 |
| 4,194,949 | 1/1980 | Stark | 202/180 |

FOREIGN PATENT DOCUMENTS 921418 5/1947 France .
2208844 6/1964 France .

*Primary Examiner*—Frank Sever
*Attorney, Agent, or Firm*—Fleit & Jacobson

[57] ABSTRACT

A device for desalting sea or brackish water using solar energy, characterized by the fact that it includes two adjacent canals or equivalent structures fed with the sea or brackish water, a green house type structure over one of the canals to vaporize water from it and a structure for condensation of water and for collecting softwater, the structure being in communication with the greenhouse structure and largely immersed in the other canal, which acts as the cold source for the condensating unit.

6 Claims, 10 Drawing Figures

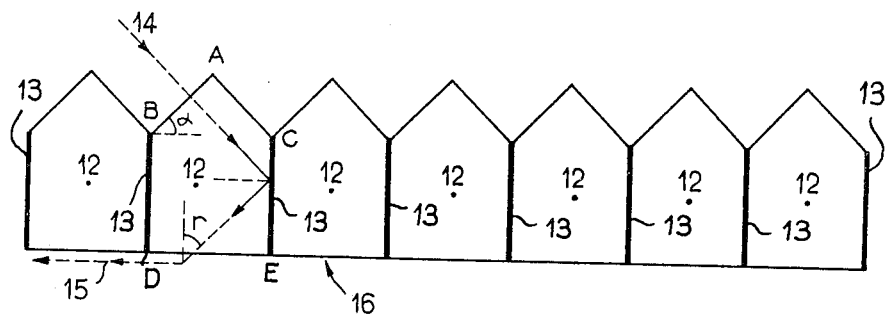
FIG_4
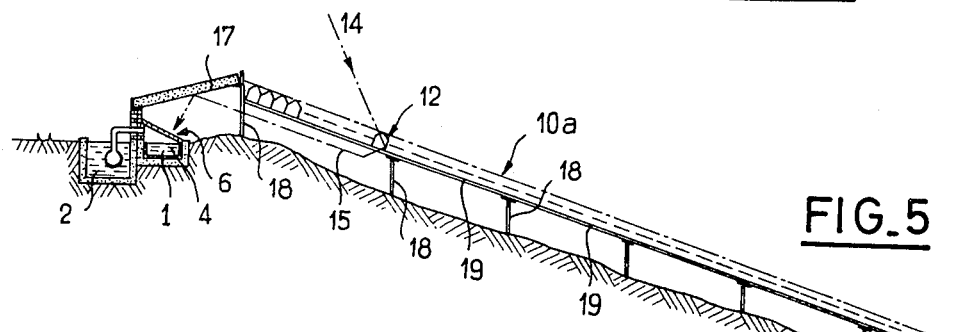
FIG_5
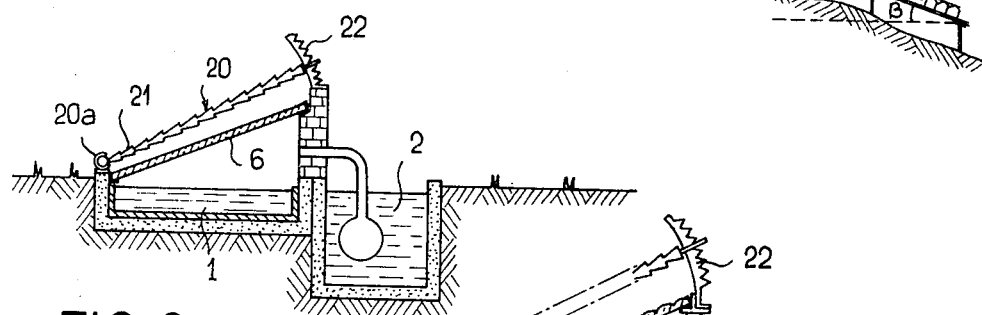
FIG_6
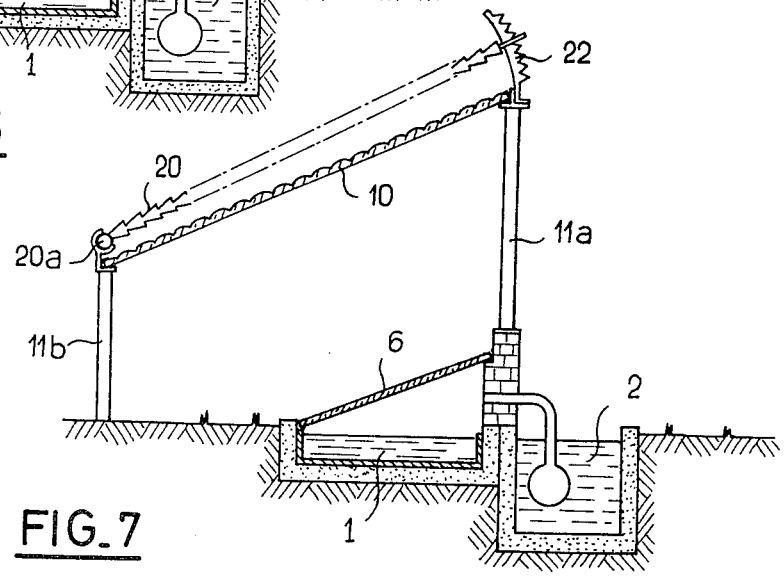
FIG_7

DEVICE FOR DESALTING SEA OR BRACKISH WATER BY USING SOLAR ENERGY

The invention aims at providing a solution to the production of softwater using solar energy in desertic regions, where the sea or brackish water is available, by simple means requiring little and in any case unskilled labor for their maintenance, and only simple typically road building workmanship for their implementation, this in such a way that any automated or electronic control system is avoided.

With this aim in mind, the device for desalting sea or brackish water using solar energy according to the invention is characterized essentially by two adjacent canals or equivalent systems fed with sea or brackish water, a greenhouse type structure placed over one of the said canals for vaporizing the water and a condensating and softwater collecting structure in communication with the said greenhouse structure and for a large measure placed under water in the other canal, which acts as the cold source for the condensating unit.

Preferably one couples the greenhouse structure with a structure for the optical concentration of the sun rays, which can take different simple and efficient embodiments, as seen further on.

It is necessary to be able to trap and also to renew the sea or brackish water in at least the canal used for vaporizing water. Thus a device for desalting water according to the invention will also include preferably another canal or equivalent structure running parallel to the canals mentioned above and used for feeding the said canals with sea or brackish water. The means for trapping and renewing the sea or brackish water will, then, consist of sluices placed between the feeder-canal and each of the said canals.

One knows, of course, that sea water contains approximately 4.5% by weight of salt (density 1.03), while it could contain up to 26% before being saturated. It is, thus, possible to obtain softwater by vaporization of sea water without the formation of salt-deposits as long as one renews the seawater one uses for that purpose before its salinity exceeds the critical salinity. One must, nevertheless, be also able to maintain in the canal used for the vaporization a temperature corresponding to a useful partial vapor-pressure. Because the solar energy available is small, one should not use more sea or brackish water than required. This is why the periodical trapping and renewing of the water is necessary in order to obtain an acceptable efficiency.

The cold source provided by the said second canal is simply the consequence both of the natural evaporation of the sea water which acts as a regulator and also of the reradiation at night.

Other particular aspects of the invention will appear in the following description of various implementations of such a desalting device. They are given as examples and with reference to the appended drawings, in which:

FIG. 4 shows a cross-section of a prismatic panel for concentrating the sun rays;

FIG. 5 shows a cross-section of a desalting device using for the concentration of solar energy panels such as the one shown on FIG. 4;

FIG. 6 shows a cross-section of another variation on the implementation of a device such as the one shown on FIG. 2;

FIG. 7 shows a cross-section of another variation on the implementation of a device such as the one shown on FIG. 3;

Figure 1:
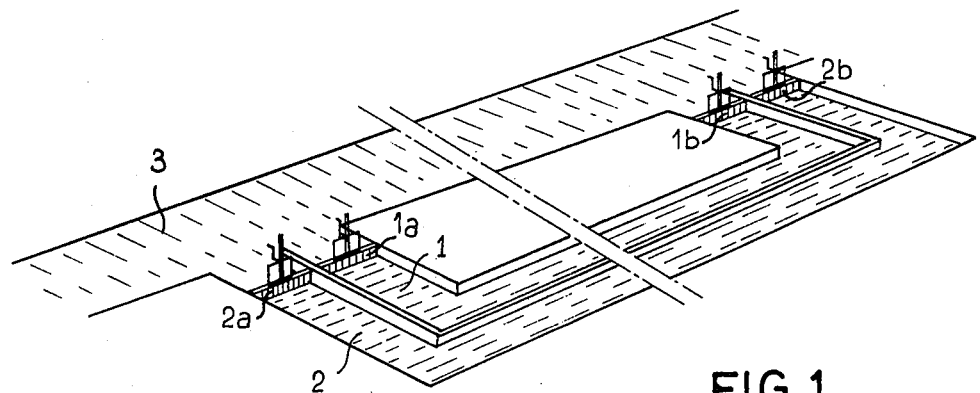
FIG. 1 is a perspective view showing the lay-out for the two canals of the device placed along a feeder-canal.

The layout for the canals or equivalent structures of a desalting device shown on FIG. 1 shows two horizontal canals 1 and 2 linked by ordinary manually activated sluices 1a, 1b, 2a, 2b to a canal 3 or to a pipe fed with sea or brackish water. The pressure drop along canal 3 should be sufficient to get sea water flowing inside canals 1 and 2 by simply opening the head sluices 1a and 1b and the foot sluices 2a and 2b. The closing of these sluices traps the water inside both canals 1 and 2.

Canal 1 is meant to be the hot temperature heat source for vaporizing water while canal 2 is meant to be the cold temperature heat source for a structure on which softwater vaporized from canal 1 will be condensating.

Figure 2:
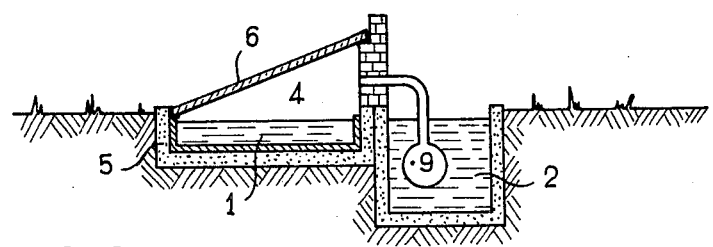
FIG. 2 shows a cross-section of the two canals equipped to provide the desalting action according to the invention.

As seen on FIG. 2, bottom and sides of canal 1 are provided with a radiation absorbant coating (for instance a black paint). The canal is embedded in a refractory layer made for instance of sand or bricks.

The canal is enclosed and topped by a transparent pane 6 for instance made of glass, placed at a slant to either assure that the surface of said pane is orthogonal on the average to the sun rays at noon (the slant of the pane varies with latitude), or satisfy other conditions mentioned later.

A wall 7 which supports the topside of pane 6 is made of refracting material (such as bricks).

The device described so far acts as a greenhouse over canal 1.

Wall 7 is pierced with holes allowing for pipes 8 which link canal 1 with a pipe 9 placed in canal 2 (for instance at the bottom). This latter constitutes the structure for the condensation of water. Through gravity alone pipe 9 can lead to a storage tank (not shown) where the condensed softwater accumulates, or can lead to a series of smaller storage tanks placed from time to time along its length which can for instance act as constant level tanks placed at the head of underground irrigation ducts, in the fashion required for example by the irrigation process named BIP of the French Corporation BERTIN.

Canal 2 is open to the ambient air so that the sea water it contains stays at a temperature defined by the ambient temperature and the vaporization it generates. The capacity of this canal can be chosen for keeping proper its temperature according to the ambient conditions at hand. If desired, wall 7 can be outfitted with any additional screen to protect canal 2 from direct sun light.

With such a plant, one can obtain, from a canal 1 m large, from 4 to 8 $m^3$ of fresh water per day per km of canal. A benchmark for agriculture is the need for 1 liter/second/hectare per sunshine hour for a non-decerning watering system, or about 2 liters/day/$m^2$. A more advanced watering scheme (such as BIP mentioned earlier for example) reduces the quantity of water necessary by 30%, thus requires only 0.6 liter/day/m$^2$. Thus, the device described so far allows one to irrigate from 7 to 14 m$^2$ per m of canal. One can also foresee that the device could satisfy the softwater needs of 1 to 2 people per m of canal.

Figure 3:
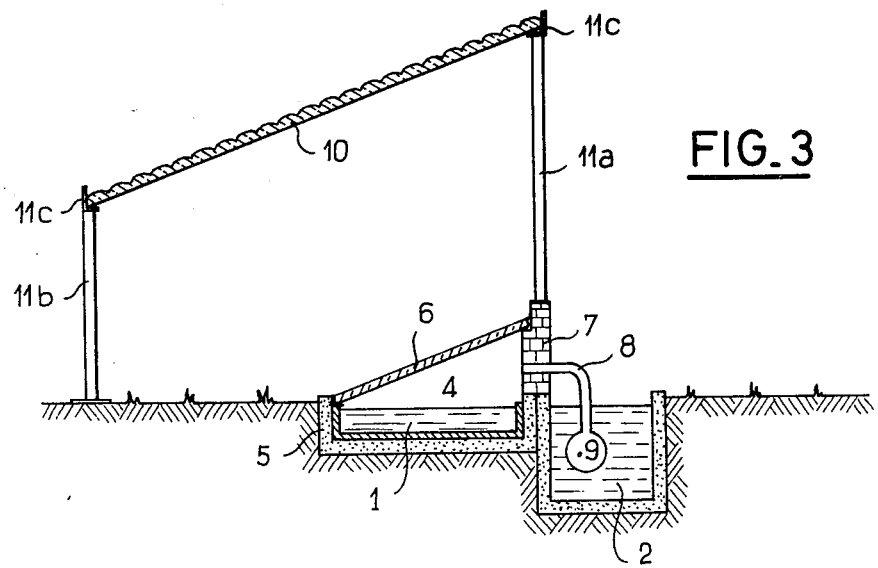
FIG. 3 shows a cross-section of a variation on the preceding device, which increases the output.

To obtain better results, it is necessary to concentrate the solar energy. FIG. 3 shows the device shown on FIG. 2 to which one has added a structure for the concentration of solar energy made of transparent panels (10) molded on their exterior face (it could also be on both faces) into a Fresnel lens which focuses the sun energy inside the greenhouse 4.

Such panels can be made from plastics, for instance from methacrylic resins, and formed into a cylindrical Fresnel lens by molding. The grooves providing the lens effect will stretch horizontally parallely to canal 1. The slope given to panels 10 is the same as the one given to panes 6. Thus, the annual average direction of the sun rays at noon will be chosen normal to panels 10 and during the day the sun rays will remain more or less within a plane both orthogonal to panels 10 and to the cross-section of canals 1 and 2. In this manner, the focusing of the rays will continue to occur within the greenhouse 4.

Because the distance between 10 and 4 must be of the same order as the width of 10 (which is the distance AB) the height of the structure supporting 10 may become important, even though that structure may require in principle only posts 11a, 11b, linked by L-shaped bars 11c holding the panels.

The wall 7a between the two canals can however be made higher, so that also its shadow will protect canal 2 from the sun.

At night, it is advisable to unfurl or place screens or any kind of blanket above the panes 6, to minimize the losses by radiation in the greenhouse. This could also be done in the case of FIG. 2.

A device such as the one shown on FIG. 3 permits one to irrigate from 70 to 140 m$^2$ per m of canal (assuming canal 1 to be 1 m wide) or to satisfy the water needs of from 10 to 20 people per meter of canal.

One has shown on FIG. 4 another device for the concentration of solar energy which is of greater capacity. This device is also made of panels. Each panel is made of elongated cells 12, seen in cross-section on FIG. 4 (such that their vertical sides 13 are metallized—rendered reflecting). The sun rays at noon enter the transparent material of each cell normally to the face BA. Face AC is orthogonal to face BA so that it cannot interfere with the sun rays striking the next cell. Angle α made by face BA with the horizontal BC is chosen so that the sun rays 14 are refracted for the most part at face DE, along that face. Thus angle r̄ must correspond substantially to the Brewster conditions, this means that, if n is the refractive index of the cell's material, α=arc sin (1/n). As refractive indices do not vary much (between 1.4 and 1.6) α is of the order of 45° (correct value when n=1.414).

Thus, such panels bend part of the solar energy in a given direction 15 along their bottom surface 16.

FIG. 5 corresponds to the implementation of a desalting device using the means for solar concentration shown on FIG. 4.

The solar rays such as 14 find themselves after crossing the cells 12 bent in a direction parallel to the bottom face of panels 10a. They then strike a reflecting roof (mirror) 17 and enter canal 1 through pane 6.

The solar concentrator is kept above ground by a very light structure which is made of poles 18 interconnected by beams 19, these beams remaining in the plane of the Figure in order to avoid the presence of beams parallel to the canals, which would intercept the rays bent as indicated.

The slope β is so chosen that the solar rays, when the sun is at the zenith, are orthogonal to the incident faces of the cells. The slope would be zero for rays making a 45° angle with the horizontal, it is 15° for rays making a 60° angle with the horizontal, it is 25° for rays making a 70° angle with the horizontal.

The refractory material 20 is placed behind mirror 17 to also screen the greenhouse against radiation losses during the night.

Another solution for the concentration of solar energy shown on FIG. 6 consists in compensating the annual variations in solar attitude by means of a screen 20 made of prisms 21. Following a precise calendar schedule, one can either change such screen as 20, it means use screens made of prisms of different apex angles, or adjust the slope of the screen. To do the latter, circular mounts 22 can be affixed to wall 7 and provided with rungs in which the screen can be held according to the slope desired, if said screens are also mounted in 20a in such a way that they can rotate. The number of times one changes screens or one changes the slope of the screen within a year can be computed, taking into account the losses through the screen and the losses through pane 6 when the solar rays do not strike the screen normally. Such screens can be molded and be made of plastic material just as well as the panels 10 which act as Fresnel lens.

The screens will be kept in place by a frame imparting to them the necessary mechanical qualities.

As shown on FIG. 7, such a screen 20 can also be used in conjunction with a panel 10 acting as a Fresnel lens (mounted as shown on FIG. 3) so that the sun rays will keep striking normally the panel 10 during all year.

In both the cases of FIG. 6 and FIG. 7, the slope of the panel 6 or of the panel 10 acting as a Fresnel lens will be so chosen that the sun rays, at noon on the longest day of the year, will be normal to 6 and or 10, so that screen 20 will be taken off at that time. During the rest of the year, when the sun at noon will be lower in the sky, the screen will be used and will be placed at a slant which will always be greater than the one given to 6 or 10.

Figure 8:
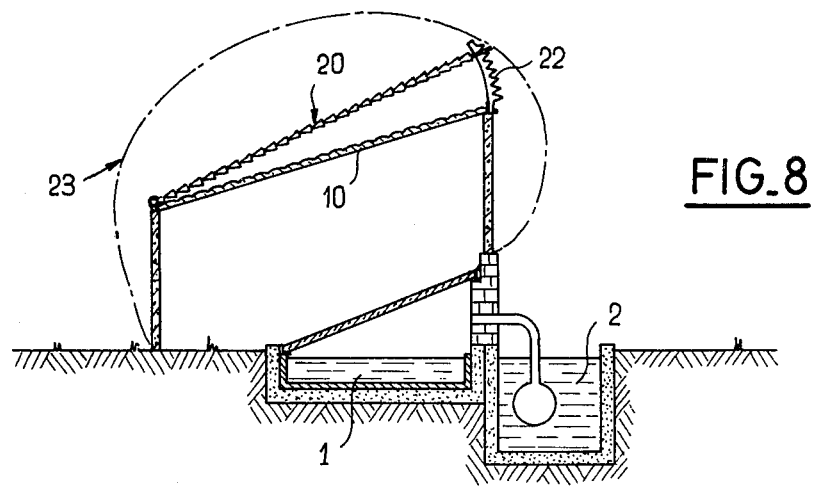
FIG. 8 shows a cross-section of a variation on the preceding one.

FIG. 8 shows a solution of the same type as the one shown on FIG. 7, but it differs from the latter by the size, and principally because the width of panel 10 acting as a Fresnel lens is only, for instance, twice the one of pane 6. One can propose that in this case instead of erecting a wood frame or even walls, the overall optical structure (by which we mean the panel 10 and its support) can constitute a sort of casing 23, which can be transported either as a kit or premounted. Thus, in the case of a canal 50 cm wide for instance, the dimensions of the casing will be of the order of a meter.

Figure 9:
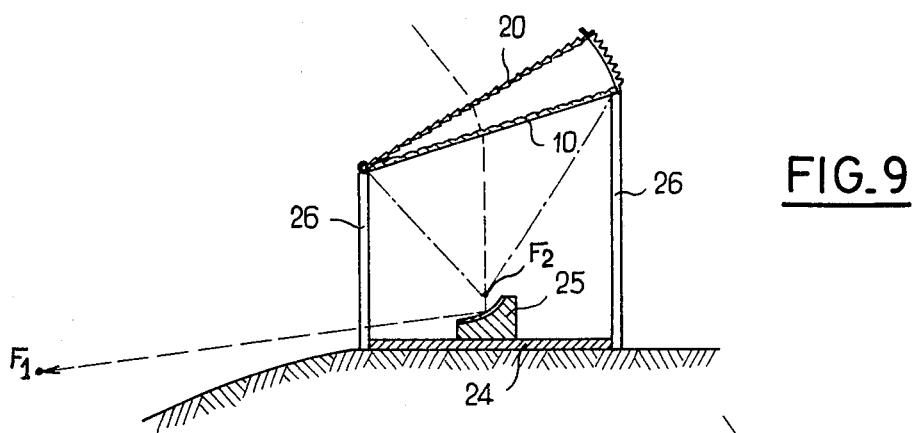
FIG. 9 shows a cross-section of another structure for the concentration of solar energy.

A reduction of the size of panel 10 acting as a Fresnel lens can also lead to another device for the concentration of solar energy, as shown on FIG. 9. It is a casing such that its dimensions can be for example of the order of a meter which includes a floor 24 on which is placed an elliptic mirror 25 used for refocusing the solar energy focused in F2, by the panel 10 acting as a Fresnel lens and the screen 20, into a further focal point F1.

While the faces of the casing parallel to the plane of the figure can be filled, the faces orthogonal to the plane of the figure (at least the ones facing F1) must be hollow so that, in general, the mounting pieces named 26a, 26b are posts.

With such a device a certain precision is necessary and screen 20 becomes an absolute necessity in order to use the device all year long. In the case when F1 is meant to occur under pane 6 in canal 1, its position can vary by dimensions of the order of 50 cm which over a span of 20 m leads to a possible angular tolerance of less than 2°.

Figure 10:
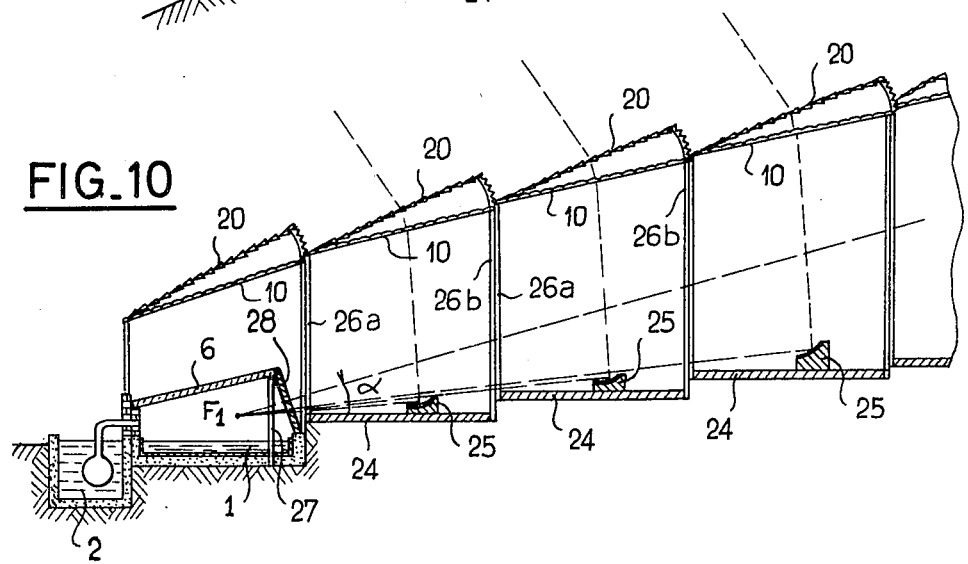
FIG. 10 shows a cross-section of a desalting device using structures such as the ones shown on FIG. 9.

As shown on FIG. 10, one can then use a number of casings of the type shown on FIG. 9 to concentrate the solar energy captured over a very large surface at a point F1 which falls in canal 1 under pane 6. The shape of the roof of the greenhouse over canal 1 is somewhat modified to allow for the entrance of the sun rays captured by the casings, it means that the poles 27, supporting pane 6 and interconnected on top, support also another more or less vertical transparent pane 28. Also the casings for concentrating the sun energy are placed in such a way that neither obstructs the rays coming from the ones that are further away.

The necessary precision for the device can be obtained at the factory before transportation to the location where it will be used. For that purpose the vertical edges 26a and 26b of adjacent casings will be provided with notches or holes for screws or with any other means such that it will be impossible to place the different casings of a set differently from the intended way.

The angle α for the rays entering canal 1 can be chosen close to 20° and the number of casings one can place along a direction orthogonal to the canal, while limited, can easily reach 20.

Naturally other variations can be imagined without straying from the domain of this invention.

I claim:

1. A device for desalting sea or brackish water using solar energy comprising:

two adjacent canals or equivalent structures both fed by said sea or brackish water;

a greenhouse like structure placed on one of said canals to vaporize water and including a transparent pane slanted with respect to the horizontal forming a top of the structure;

a second structure for condensating the vaporized water and recovering the condensed water, said second structure being in fluid communication with said greenhouse like structure and mostly immersed in the other of said two canals, the water in the second canal acting as a cold source for condensating the vaporized water;

roof means for forming a roof positioned above said pane of said greenhouse like structure, said roof means having a reflecting lower surface slanted with respect to the horizontal; and means for concentrating solar rays comprising a plurality of panels extending longitudinally away from said roof means, each of said panels being comprised of at least one cell having a transparent upper surface and a reflecting surface so positioned as to direct rays passing through the upper surface of the cell towards the reflecting lower surface of said roof means in such manner that the rays are reflected by said reflecting lower surface through said transparent pane into the interior of said greenhouse like structure to thereby vaporize water from said one of said canals.

2. A device for desalting according to claim 1, characterized by the fact that it includes means for trapping and renewing the sea or brackish water for at least the canal from which water is vaporized.

3. A device for desalting according to claim 2, characterized by the fact that it includes a canal or equivalent structure for feeding sea or brackish water into the two canals mentioned above, such canal or equivalent structure running in a parallel direction to the one of said canals, the said means for trapping and renewing sea or brackish water being made of sluices providing communication between each of the canals and the said feeder-canal.

4. A device according to claim 1 wherein said roof means further comprises refractory material positioned above said lower reflecting surface so as to screen the greenhouse like structure against radiation losses.

5. A device according to claim 1 or 4 wherein the cells of said plurality of panels have lower surfaces arranged in a common plane slanted with respect to the horizontal.

6. A device according to claim 1 or 4 wherein the reflecting surface of said cells of said panels comprises a metalized vertical side, and wherein each cell has a refractive bottom surface.

* * * * *

UNITED STATES PATENT AND TRADEMARK OFFICE
CERTIFICATE OF CORRECTION

PATENT NO. : 4,292,136
DATED : September 29, 1981
INVENTOR(S) : Philippe CLAVIER It is certified that error appears in the above—identified patent and that said Letters Patent is hereby corrected as shown below:

On the title page, reference to the assignee should read as follows:

-- [73] Assignee: Spie-Batignolles, Puteaux, France, a part interest --.

Signed and Sealed this

Sixteenth Day of March 1982

[SEAL]

Attest:

Attesting Officer

GERALD J. MOSSINGHOFF

Commissioner of Patents and Trademarks